United States Patent Office 2,881,132
Patented Apr. 7, 1959

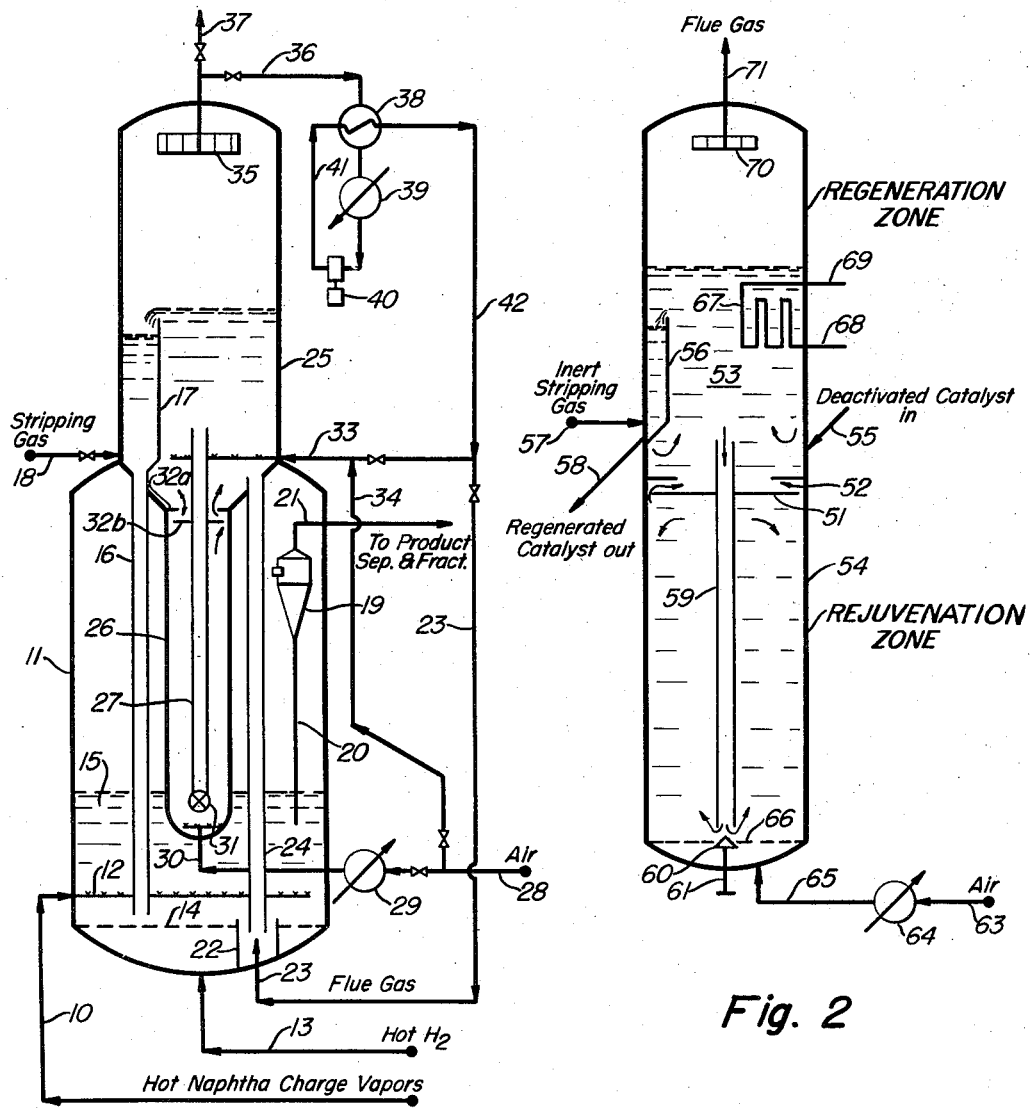

2,881,132

FLUIDIZED SOLID CATALYST REGENERATION-REJUVENATION SYSTEM

Robert J. Hengstebeck, Valparaiso, Ind., assignor to Standard Oil Company, Chicago, Ill., a corporation of Indiana Application August 11, 1953, Serial No. 373,628

6 Claims. (Cl. 208—140)

This invention relates to the hydroforming of naphtha boiling range hydrocarbons with fluidized catalysts which may be improved in effectiveness by rejuvenation in addition to conventional regeneration, a preferred example of such catalyst being platinum-on-alumina.

It is known that platinum catalysts containing about .05 to 1 percent of platinum on a support such as alumina are very effective for hydroforming certain naphtha fractions, i.e. effecting dehydrogenation of naphthenes and isomerization and aromatization of paraffins. More recently it has been found that such catalysts may be operated at relatively low pressures of the order of 100 to 350 p.s.i. and on charging stocks containing heavy naphtha fractions for producing products having CFR-R octane number of the order of 95 to 100, the catalysts in such cases requiring periodic rejuvenation by treatment with a hot gas having a high oxygen partial pressure subsequent and in addition to the conventional regeneration treatment. An object of this invention is to provide a unitary regeneration-rejuvenation system in which the oxygen content of the gas employed for effecting rejuvenation is utilized for effecting combustion in the regeneration and in which the contact time in the rejuvenation step may be controlled independently of the contact time in the regeneration step. A further object is to minimize the construction and operating costs of a catalyst regeneration and a rejuvenation system. Other objects will be apparent as the detailed description of the invention proceeds.

In accordance with this invention, a single vessel is employed for effecting both regeneration and rejuvenation. Rejuvenation is affected in a segregated portion of the vessel which is below the regeneration zone but which directly merges with the regeneration zone through a baffled dense phase region so that the rejuvenation gas passes directly through the regeneration zone for effecting combustion of carbonaceous deposits therein. Deactivated catalyst is constantly introduced into the regeneration zone and withdrawn therefrom at substantially the same rate back to the conversion zone. A portion of the catalyst is continuously or periodically withdrawn from the dense phase in the regeneration zone into the rejuvenation zone to displace rejuvenated catalyst through the merging zone back to the regeneration zone. Each portion of catalyst thus introduced into the rejuvenation zone may be rejuvenated for a period of time which is independent of the catalyst-to-oil ratio in the conversion zone and which may be in the range of 1 to 24 hours, preferably about 4 to 12 hours. An arrangement of baffles in the merging zone provides a path whereby the rejuvenation gases are distributed at the base of the regeneration zone, while at the same time, preventing undue mixing of catalyst which is undergoing regeneration with catalyst in the rejuvenation zone. Heat is supplied to the air or other oxygen-containing gas employed for rejuvenation and heat is abstracted from the regeneration zone either by recycling flue gas through a cooler to the base of said zone or by employing an indirect heat exchanger within the regeneration zone.

The invention will be more clearly understood from the following detailed description of specific examples thereof read in conjunction with the accompanying drawings which form a part of this specification and in which:

Figure 1 is a schematic flow diagram illustrating a regeneration-rejuvenation vessel wherein the regenerator is cooled by flue gas recycle, and Figure 2 is a schematic flow diagram illustrating a regeneration-rejuvenation vessel wherein the regenerator is cooled by a heat exchanger.

All of the examples will be described for use with a Mid-Continent naphtha charging stock having an API gravity of about 55 to 56, an ASTM distillation range of about 200 to 360° F. (10 percent point about 240° F. and 90 percent point about 310–330° F.), and F–1 clear octane number of about 44, a sulfur content of about .02 to .03 weight percent and containing about 51 volume percent paraffins, 40 volume percent naphthenes and 9 volume percent aromatics. It should be understood, however, that naphthas from other sources may be employed but it is preferred that the naphthas be rich in naphthenes and that they be as free from sulfur as is economically feasible. Also, the invention is applicable to naphthas of wider boiling range and of other percentage compositions.

The charging stock, preferably after stripping with hydrogen to remove any moisture, oxygen, or $H_2S$ which it might contain, is introduced as a vapor through transfer line 10 at a temperature of about 900 to 950° F., e.g. 920° F., under a pressure in the range of about 100 to 350 p.s.i.g. preferably about 200 p.s.i.g. into reactor 11, preferably through distributor 12 at a level spaced from the bottom thereof. A recycled hydrogen stream in amounts of about 1000 to 8000 cubic feet (standard conditions) per barrel is heated to a temperature of about 1000° F. to 1300° F., e.g. 1150° F., and introduced through line 13 below distributor grid 14. A mixture of regenerated and rejuvenated catalyst is introduced into the dense catalyst phase 15 in reactor 11 by standpipe 16 above grid 14 but below distributor 12 so that it is contacted with hot hydrogen before it meets charging stock. Standpipe 16 withdraws catalyst from stripping well 17 at the base of which a stripping gas is introduced through line 18. The hot hydrogen and naphtha vapors pass upwardly through the reactor at a vertical velocity of the order of about .3 to 3 feet per second sufficient to maintain a fluidized dense phase of catalyst in the lower part of the reactor.

The catalyst is preferably one which has been prepared by contacting an aqueous solution of chloroplatinic acid containing from about 3.5 grams of platinum per liter with an ammonium sulfide solubilizing agent for converting the platinum into a solubilized form of platinum sulfide in a stable aqueous solution, then combining this true or colloidal solution with hydrous alumina prepared as taught in U.S. Re. 22,196, the relative amounts of the two components being such as to produce a final catalyst containing about .3 to .5 percent or more of platinum by weight on a dry $Al_2O_3$ basis, the resulting mixture being then dried and calcined. The alumina may contain up to approximately 1 percent by weight of fluorine (although it is preferably fluorine-free) and it may contain a small amount of titania but it should be substantially free from sodium, iron and molybdenum oxides since the latter have been found to poison the resulting catalyst. Other methods of preparing the alumina base may be employed but best results are obtained by using an alumina of the highest purity obtainable. Also other methods may be employed for incorporating the platinum but since these form no part of the present invention, they will not be described in further detail. The catalyst should have a particle size in the range of about 1 to 200 microns, chiefly of about 2 to 100 microns.

The reaction is preferably effected at about 200 to 300 p.s.i.g. at a temperature of about 850 to 950° F. and with a space velocity in the range of about 1 pound per hour of naphtha per pound of catalyst in the reactor to about 10 pounds of naphtha per hour per pound of catalyst in the reactor, the preferred weight space velocity being at least about 4. The product stream from the upper part of the dilute phase in the reactor passes through cyclone separator 19 from which separated catalyst is returned by dip leg 20 to the dense phase and the product stream is discharged through line 21 to any known system for recovering entrained catalyst, separating hydrogen for recycle and fractionation into reformed naphtha and other products (e.g. as described in the API paper describing the Destrehan fluid hydroformer, Proceedings American Petroleum Institute, Refining, volume 32M (III) 1952).

Catalyst is continuously withdrawn from reactor 11, preferably below the charging stock inlet, by passage into well 22 from which it is carried by recycled flue gas from line 23 upwardly through riser line 24 into the regeneration zone of vessel 25. In Figure 1 the regeneration zone of vessel 25 is of larger diameter than the rejuvenation zone, the latter being within the narrowed portion 26. Catalyst may flow from the regeneration zone to the rejuvenation zone by standpipe 27 which extends from the dense phase in the regeneration zone to a point near the base of rejuvenation zone. Air for effecting rejuvenation is introduced by line 28, heated in air heater 29 to a temperature in the range of about 950 to 1250° F., then introduced by line 30 through a suitable distributor at the base of the rejuvenation zone. A valve 31 at the base of standpipe 27 can be opened or shut to control transfer of catalyst from the regeneration zone to the rejuvenation zone. At the upper end of narrowed portion 26 of vessel 25 there is an annular baffle 32a whose outside edge is secured to vessel 25. Below the annular baffle is a disk baffle 32b whose outer edge is spaced from the walls of narrowed portion 26. These baffles provide a means for segregating the rejuvenation from the regeneration zones while, at the same time, distributing air or rejuvenation gas from the top of the rejuvenation zone at the base of the regeneration zone.

In fluidized solids systems there is a tendency for the turbulent catalyst mass to be carried upwardly near the center of the zone and downwardly near the periphery thereof. Baffle 32b will thus serve as a deflector for preventing upflow of catalyst from the rejuvenation zone to the regeneration zone while baffle 32a serves as a deflector for preventing backflow of catalyst from the regenerator to the rejuvenator. In the circuitous flow path in the zone of merger between the baffles, the gas velocity will be higher than in the main portion of the rejuvenation zone and some catalyst, of course, will be carried with gases through this zone of merger into the regeneration zone throughout the rejuvenation period. However, the defined baffle arrangement provides sufficient segregation so that an isolated body of catalyst undergoing rejuvenation may be contacted with a rejuvenation gas of high oxygen partial pressure for a predetermined time, e. g. 4 to 12 hours regardless of the rate at which catalyst is being introduced into the regeneration zone through line 24 or withdrawn therefrom through well 17 and standpipe 16.

Valve 31 may be set to provide any average catalyst holding time in the rejuvenation section. In fact, valve 31 may be entirely closed so that rejuvenation may proceed for a period of hours and then opened to periodically rejuvenate a segregated portion of the regenerated catalyst. During periods of transfer, rejuvenated catalyst flows with the rejuvenation gas through the baffled zone of merger and becomes commingled with regenerated catalyst before it is returned to the reactor.

In the embodiment shown in Figure 1, flue gas is introduced at the base of the regeneration zone through line 33 and, if necessary, any additional oxygen or air may be introduced through line 34. When the rejuvenation zone is one-fifth the cross sectional area of the regeneration zone, about 4 volumes of flue gas may be introduced by line 33 for each volume of hot rejuvenation gas so that the upward gas velocity in the regenerator is substantially the same as in the rejuvenator, the rejuvenation gases being cooled by the introduced flue gas to a sufficiently low temperature, usually below 950° F., so that the maximum temperature in the regeneration zone does not exceed about 1250° F. Thus the oxygen content of the rejuvenation gas may be substantially quantitatively utilized for effecting combustion of carbonaceous deposits in the regeneration zone to give a substantially oxygen-free flue gas.

The flue gas is withdrawn from the top of vessel 25 through a filter system 35 or any other known means for effecting separation of solids. The solids-free flue gas is withdrawn through line 36, a portion thereof is vented through line 37 and the rest is recycled through heat exchanger 38, cooler 39, compressor 40, line 41, exchanger 38 and line 42 to supply the flue gas for lines 33 and 23, respectively, the recycled flue gas usually being cooled to a temperature of the order of 700 to 900° F.

In Figure 2 a regeneration-rejuvenation vessel 50 is segregated by disk baffle 51 and annular baffle 52 into an upper regeneration zone 53 and a lower rejuvenation zone 54. Partially spent catalyst from the conversion zone is introduced through line 55 into regeneration zone 53 and catalyst is withdrawn at substantially the same rate through well 56 wherein it is stripped with an inert stripping gas 57 and then removed by line 58 for return to the conversion zone. Catalyst is continuously or periodically withdrawn from dense phase 53 through standpipe 59 in amounts controlled by plug valve 60, the position of which is controlled by any suitable interior or exterior mechanism 61. Air from source 63 is preheated in heater 64 to a temperature of 950 to 1250° F., preferably about 1050° F., and introduced by line 65 at the base of vessel 50 where it is distributed by grid 66. This hot air passes upwardly through the rejuvenation zone at a velocity in the range of about .3 to 3 feet per second, then passes between baffles 51 and 52 to supply the regeneration gas for the dense catalyst phase 53. In this case a heat exchanger 67 is provided in the dense turbulent phase 53 with an inlet connection 68 and outlet connection 69 for introducing and withdrawing sufficient heat exchange fluid for controlling the temperature in the regeneration zone and keeping it below about 1250° F. The flue gas is withdrawn through filter 70 or equivalent catalyst separation means and is then vented by line 71. In this example the recycling of flue gas is unnecessary since the rejuvenation and regeneration zones are of substantially the same cross sectional area and temperature in the regeneration zone is controlled by exchanger 67.

While a single set of baffles has been shown to effect segregation of rejuvenation and regeneration zones, it should be understood that more than one set may be employed and that additional baffles and/or distributing means may be employed for insuring the necessary distribution of air from the rejuvenation zone at the base of the regeneration zone.

Hydroforming of naphtha with platinum-on-alumina catalysts is usually effected at temperatures of the order of 800 to 950° F. under pressures of the order of 200 to 500 p.s.i.g. and with weight space velocities of the order of 1 to 10 pounds of naphtha introduced per hour per pound of catalyst in the reactor. The incoming catalyst-to-oil ratio may vary within the relatively wide limits of .05:1 to 5:1 or more. With high catalyst-to-oil ratios the amount of carbon on the catalyst may be less than .01 weight percent based on catalyst, the carbon content usually ranging from .01 to 1 percent.

Regardless of the catalyst-to-oil ratio employed and the corresponding catalyst residence time in the regeneration zone, the system hereinabove described makes possible the independent control of catalyst residence time in the rejuvenation zone. It is preferred that the substantially carbon-free catalyst which is undergoing rejuvenation be contacted for at least about an hour and preferably about 4 hours or more with a gas having an oxygen partial pressure of .4 atmosphere and preferably greater than 1 atmosphere at a temperature in the range of 950 to 1250° F. Thus in an operation at 300 p.s.i.g. wherein the air is preheated by partial combustion with a fuel gas, the oxygen partial pressure may be about 2 to 4 atmospheres.

The above descirption does not purport to describe the entire hydroforming system but is directed to that portion thereof required for an understanding of this invention. Any known means may be employed for supplying heat to the fluidized solids in the reactor. Alternative structural arrangements and operating conditions will be apparent from the foregoing description to those skilled in the art.

I claim:

1. In a fluidized solids catalyst hydroforming system employing a catalyst which requires periodic rejuvenation in order to maintain it at high activity and low rate of activity decline, the method of treating catalyst from the conversion zone before returning it thereto which comprises introducing said catalyst to a regeneration zone in a unitary regeneration-rejuvenation vessel, burning carbonaceous deposits from the catalyst in said regeneration zone by passing upwardly therein a hot oxygen-containing stream which has previously been utilized for effecting catalyst rejuvenation, passing said stream upwardly in the regeneration zone at a rate to maintain a turbulent dense phase of catalyst therein, removing heat from the regeneration zone at a rate to maintain the dense phase therein at a temperature in the range of about 850 to 1250° F., separating catalyst from flue gas in the upper part of the regeneration zone, withdrawing catalyst from the regeneration zone for return to the conversion zone, separately withdrawing part of the catalyst from the dense phase in the regeneration zone to a separate rejuvenation zone which is within said vessel and which communicates through a merging zone with the dense catalyst phase in the regeneration zone, introducing a hot oxygen-containing gas at a temperature in the range of 950 to 1300° F. at the base of said rejuvenation zone, said gas having an oxygen partial pressure greater than .4 atmosphere, and passing said hot oxygen-containing gas from the top of the rejuvenation zone through said merging zone to the base of the dense catalyst phase in the regeneration zone.

2. The method of claim 1 which includes the step of periodically interrupting the transfer of catalyst to and from the rejuvenation zone for a time sufficient to effect contact of catalyst in the rejuvenation zone for a period of about 1 to 24 hours.

3. Apparatus for treating catalyst from a conversion zone before returning said catalyst thereto which comprises a unitary vessel, an annular baffle extending to the vessel wall at an intermediate level therein, a disk baffle beneath said annular baffle to provide a zone of marger between a regeneration zone in the upper part of the vessel and a rejuvenation zone in the lower part of the vessel, a conduit extending downwardly from the regeneration zone to a low point in the rejuvenation zone, a control for restricting flow of solids through said conduit, an air preheater and a connection for introducing preheated air at the base of said vessel, connections for supplying a coolant in the upper part of said vessel, a conduit for introducing solids into the upper part of said vessel, a catalyst inlet communicating with the upper part of the vessel, a catalyst outlet spaced from the catalyst inlet and leading from an upper part of said vessel, a catalyst separator at the top of said vessel and a conduit for withdrawing gases from said separator.

4. The apparatus of claim 3 wherein the connections for supplying a coolant comprise an external heat exchanger and conduits for recycling gases withdrawn from said separator through said external heat exchanger to a point in the vessel above said baffles.

5. Apparatus for treating catalyst from a conversion zone before returning said catalyst thereto which comprises a regenerator, a rejuvenator extending downwardly from the regenerator, a vertical conduit extending from the lower part of the regenerator to the lower part of the rejuvenator, a tortuous conduit formed by baffles connecting the top of the rejuvenator with the base of the regenerator, an air heater, connections for introducing air through said heater to the base of the rejuvenator, a solids separator at the top of the regenerator, a gas heat exchanger, a gas cooler, a gas circulator and connections for passing catalyst-free gas from the top of the regenerator through one side of the heat exchanger and said gas cooler to the circulator and thence to the other side of the heat exchanger to a low point in the regenerator and means for combining a small amount of air with the connection entering the low point in the regenerator.

6. In a fluidized platinum-on-alumina naphtha hydroforming system wherein naphtha is hydroformed in the presence of hydrogen in a conversion zone maintained at a pressure of about 100 to 350 p.s.i. and at a temperature in the range of about 850 to 950° F. and wherein catalyst is continuously withdrawn from the conversion zone, regenerated in a separate regeneration zone and returned to the conversion zone, the method of treating the withdrawn catalyst before returning it to the conversion zone, which method comprises withdrawing a fluidized column of catalyst from the regeneration zone to the lower part of a subadjacent rejuvenation zone, introducing at the base of said rejuvenation zone a stream of hot air which has been preheated to a temperature in the range of 950 to 1300° F., passing said hot air upwardly through the rejuvenation zone at a rate to maintain catalyst therein in fluidized dense phase condition, returning fluidized catalyst suspended in hot air from the upper peripheral portion of the rejuvenation zone to the lower portion of the regeneration zone through a circuitous path whereby the fluidized catalyst in the regeneration zone is segregated from the fluidized catalyst in the rejuvenation zone, burning carbonaceous deposits from catalyst in the regeneration zone by oxygen contained in the fluidized catalyst introduced to said zone through said circuitous path, removing heat from the regeneration zone to prevent its temperature from exceeding 1250° F., returning catalyst from the regeneration zone to the conversion zone at substantially the same rate as catalyst is introduced from the conversion zone to the regeneration zone, and recovering catalyst from flue gas discharged from the top of the regeneration zone.

References Cited in the file of this patent

UNITED STATES PATENTS

| | | |
|---|---|---|
| 2,427,341 | Alther | Sept. 16, 1947 |
| 2,428,873 | Gunness | Oct. 14, 1947 |
| 2,449,622 | Roetheli | Sept. 21, 1948 |
| 2,494,614 | Grote | Jan. 17, 1950 |
| 2,696,461 | Howard | Dec. 7, 1954 |
| 2,725,341 | Gornowski et al. | Nov. 29, 1955 |
| 2,776,248 | Hengstebeck et al. | Jan. 1, 1957 |
| 2,788,311 | Howard et al. | Apr. 9, 1957 |